US011942851B2

(12) United States Patent
Crissman et al.

(10) Patent No.: US 11,942,851 B2
(45) Date of Patent: Mar. 26, 2024

(54) HERMETIC MOTOR COOLING SYSTEM (71) Applicant: Johnson Controls Technology Company, Auburn Hills, MI (US)

(72) Inventors: Katelynn Louise Crissman, New Freedom, PA (US); Ian Michael Casper, York, PA (US); David Andrew Bradshaw, Timonium, MD (US); Matthew Lee Heisey, York, PA (US); Tyler Alexander Wolgemuth, New Freedom, PA (US); Paul William Snell, York, PA (US)

(73) Assignee: Tyco Fire & Security GMBH, Neuhausen am Rheinfall (CH)

( * ) Notice: Subject to any disclaimer, the term of this patent is extended or adjusted under 35 U.S.C. 154(b) by 376 days.

(21) Appl. No.: 16/755,108

(22) PCT Filed: Oct. 10, 2018

(86) PCT No.: PCT/US2018/055271
§ 371 (c)(1),
(2) Date: Apr. 9, 2020

(87) PCT Pub. No.: WO2019/075105
PCT Pub. Date: Apr. 18, 2019

(65) Prior Publication Data
US 2020/0240677 A1    Jul. 30, 2020

Related U.S. Application Data

(60) Provisional application No. 62/611,358, filed on Dec. 28, 2017, provisional application No. 62/610,782, (Continued)

(51) Int. Cl.
*H02K 1/20*  (2006.01)
*F25B 31/00*  (2006.01)
(Continued)

(52) U.S. Cl.
CPC ............... *H02K 5/203* (2021.01); *H02K 1/20* (2013.01); *H02K 9/19* (2013.01); *F25B 1/04* (2013.01); *F25B 31/006* (2013.01); *F25B 49/025* (2013.01)

(58) Field of Classification Search
CPC .......... H02K 5/20; H02K 5/203; H02K 5/207; H02K 1/20; H02K 9/19; H02K 9/193; H02K 9/197; F25B 31/008
See application file for complete search history.

(56) References Cited

U.S. PATENT DOCUMENTS 6,324,858 B1 * 12/2001 Holden ................. F25B 31/008
                                                         318/473
9,291,167 B2    3/2016 Schreiber
10,770,949 B2 *  9/2020 Scharlach ................ H02K 9/19
(Continued)

FOREIGN PATENT DOCUMENTS

CN    1278892 A    1/2001
CN    1738158 A    2/2006
(Continued)

OTHER PUBLICATIONS

Machine Translation of JP 2007244067 A (Year: 2007).*
(Continued)

*Primary Examiner* — Eric Johnson
(74) *Attorney, Agent, or Firm* — Fletcher Yoder, P.C.

(57) ABSTRACT

A system for cooling a hermetic motor includes a motor cooling refrigerant flow path configured to direct refrigerant from a condenser disposed along a refrigerant loop to a hermetic motor, and from the hermetic motor back to the refrigerant loop, and a housing of the hermetic motor disposed along the motor cooling refrigerant flow path and configured to receive the refrigerant from the condenser, wherein the housing of the hermetic motor comprises an annulus surrounding at least a portion of a stator of the
(Continued)

hermetic motor, and wherein the annulus comprises a plurality of openings configured to direct refrigerant toward the stator and into a cavity of the housing of the hermetic motor.

17 Claims, 7 Drawing Sheets

Related U.S. Application Data filed on Dec. 27, 2017, provisional application No. 62/570,535, filed on Oct. 10, 2017.

(51) Int. Cl.
*H02K 5/20* (2006.01)
*H02K 9/19* (2006.01)
*F25B 1/04* (2006.01)
*F25B 49/02* (2006.01)

(56) References Cited

U.S. PATENT DOCUMENTS

| | | | |
|---|---|---|---|
| 2008/0024020 A1 | 1/2008 | Iund et al. | |
| 2008/0184706 A1 | 8/2008 | Uno et al. | |
| 2009/0044548 A1* | 2/2009 | Masoudipour | F25B 1/04 |
| | | | 62/505 |
| 2010/0006262 A1 | 1/2010 | Welch et al. | |
| 2015/0180303 A1* | 6/2015 | Silva | B60K 6/48 |
| | | | 29/596 |
| 2015/0226467 A1* | 8/2015 | Sommer | F16C 37/005 |
| | | | 62/505 |
| 2016/0138841 A1 | 5/2016 | Thornton et al. | |

FOREIGN PATENT DOCUMENTS

| | | | |
|---|---|---|---|
| CN | 101772879 A | | 7/2010 |
| JP | H06346891 A | | 12/1994 |
| JP | 2006006047 A | | 1/2006 |
| JP | 2007244067 A | * | 9/2007 |
| JP | 2007244067 A | | 9/2007 |
| JP | 2009201217 A | | 9/2009 |
| JP | 2012533284 A | | 12/2012 |
| JP | 2013529452 A | | 7/2013 |
| TW | 539836 B | | 7/2003 |
| WO | 2015008390 A1 | | 1/2015 |

OTHER PUBLICATIONS

Chinese Office Action for CN Application No. 201880077851.2, dated May 21, 2021, 11 pgs.
Korean Office Action for KR Application No. 10-2020-7013087, dated Jun. 2, 2021, 8 pgs.
Japanese Office Action for JP Application No. 2020-520500, dated Jul. 5, 2021, 5 pgs.
International Search Report and Written Opinion for PCT Application No. PCT/US2018/055271 dated Jan. 30, 2019, 13 pgs.
Japanese Office Action for JP Application No. 2020-520500, dated Mar. 31, 2022, 3 pgs.
Taiwan Office Action and Search Report for TW Application No. 107135849, dated May 16, 2022, 10 pgs.

* cited by examiner

HERMETIC MOTOR COOLING SYSTEM

CROSS-REFERENCE TO RELATED APPLICATIONS

This application is a U.S. National Stage Application of PCT International Application No. PCT/US2018/055271, entitled "HERMETIC MOTOR COOLING SYSTEM," filed Oct. 10, 2018, which claims priority from and the benefit of U.S. Provisional Application Ser. No. 62/570,535, entitled "HERMETIC MOTOR COOLING SYSTEM," filed Oct. 10, 2017, U.S. Provisional Application Ser. No. 62/610,782, entitled "HERMETIC MOTOR COOLING SYSTEM," filed Dec. 27, 2017, and U.S. Provisional Application Ser. No. 62/611,358, entitled "HERMETIC MOTOR COOLING SYSTEM," filed Dec. 28, 2017, which are herein incorporated by reference in their entireties for all purposes.

BACKGROUND

The present disclosure relates generally to refrigeration systems. Specifically, the present disclosure relates to a hermetic motor cooling assembly.

A compressor of a refrigeration cycle is driven by a shaft which may be rotated by an electric motor. Heat (e.g., thermal energy) may be generated as electrical current passes through a series of windings forming a stator, which drive rotation of a rotor coupled to the shaft. The rotor and stator are contained within a motor housing that may experience an increase in temperature as heat is generated during operation of the motor. In some compressors, the rotor may be supported by electromagnetic bearings, which may also generate heat and further increase the temperature within the motor housing. Accordingly, cooling fluid may be provided to the motor via a cooling system to remove heat and avoid a decrease in performance or shut-down of the motor caused by overheating. Unfortunately, some cooling systems for motors of a refrigeration cycle may experience high pressure drop and/or reduced cooling fluid flow when a low pressure refrigerant is utilized in the refrigeration cycle. The operational limits of existing motor cooling systems may affect the total operating range of the compressor and/or the refrigeration system.

BRIEF SUMMARY

In one embodiment, a cooling system for a hermetic motor includes a motor cooling refrigerant flow path configured to direct refrigerant from a condenser disposed along a refrigerant loop to the hermetic motor, and from the hermetic motor back to the refrigerant loop, and a housing of the hermetic motor disposed along the motor cooling refrigerant flow path and configured to receive the refrigerant the condenser, wherein the housing of the hermetic motor comprises an annulus surrounding at least a portion of a stator of the hermetic motor, and wherein the annulus comprises a plurality of openings configured to direct refrigerant toward the stator and into a cavity of the housing of the hermetic motor.

In one embodiment, a heating, ventilating, air conditioning, and refrigeration (HVAC&R) system includes a refrigerant loop, a compressor disposed along the refrigerant loop and configured to circulate refrigerant within the refrigerant loop, a condenser disposed downstream of the compressor along the refrigerant loop with respect to a flow of the refrigerant within the refrigerant loop, an evaporator disposed downstream of the condenser along the refrigerant loop with respect to the flow of the refrigerant within the refrigerant loop, a hermetic motor configured to drive the compressor, and a motor cooling system. The motor cooling system includes a motor cooling refrigerant flow path configured to direct refrigerant from the condenser to the hermetic motor, and from the hermetic motor to the evaporator, and a housing of the hermetic motor disposed along the motor cooling refrigerant flow path and configured to receive the refrigerant from the motor cooling refrigerant flow path, wherein the housing of the hermetic motor comprises an annulus surrounding at least a portion of a stator of the hermetic motor, and wherein the annulus comprises a plurality of openings configured to direct refrigerant toward the stator and into a cavity of the housing of the hermetic motor.

In one embodiment, a method for cooling a hermetic motor includes diverting a portion of a refrigerant flow exiting a condenser in a refrigerant loop toward a motor cooling refrigerant path, directing the portion of the refrigerant flow along the motor cooling refrigerant path into a housing of a hermetic motor configured to drive a compressor disposed along the refrigerant loop, directing the portion of the refrigerant flow through an annulus formed in the housing of the hermetic motor, directing the portion of the refrigerant flow through a plurality of openings of the annulus, such that the refrigerant flows toward a stator of the hermetic motor and into a cavity of the housing of the hermetic motor, and directing the portion of the refrigerant flow from the cavity of the housing of the hermetic motor back toward the refrigerant loop.

DETAILED DESCRIPTION

Motors (e.g., hermetic motors) may be utilized to drive a compressor of a heating, ventilating, air conditioning, and refrigeration (HVAC&R) system. Motors produce heat during operation as a result of winding resistance and eddy current losses from the electrical current that is supplied to the motor. The heat produced by the motor transfers thermal energy to a motor housing, thereby increasing a temperature of the motor. Accordingly, at least a portion of a cooling system may be included in the motor housing to absorb the thermal energy and reduce the temperature of the motor (e.g., cool the motor). In some embodiments, the cooling system circulates refrigerant from a refrigerant loop of the HVAC&R system into the motor housing to absorb the thermal energy in the motor housing. For example, refrigerant (e.g., the cooling fluid of the cooling system) is directed from a condenser of the HVAC&R system and into the motor housing to absorb thermal energy generated during operation of the motor. The refrigerant may then be directed back to the refrigerant loop of the HVAC&R system from the motor. In some cases, the refrigerant is directed to the motor from an expansion device where the refrigerant expands from a liquid state into a vapor state or a mixture of liquid and vapor.

Some cooling systems for motors (e.g., hermetic motors) include a relatively restricted flow path for the refrigerant to flow within the motor housing. For example, cooling systems may have a helical coil configured to flow a refrigerant and wrapped around the motor jacket to place refrigerant in a heat exchange relationship with components of the motor (e.g., the rotor, the stator, and/or bearings). The refrigerant flows through the helical coil, which may include a relatively small diameter and a relatively long length. The refrigerant experiences a high pressure drop and low flow rate through the helical coil, which may cause the refrigerant to vaporize within the helical coil. Further, the helical coil limits exposure of the refrigerant to an outer surface of the motor jacket, thereby reducing an amount of thermal energy transfer between the refrigerant and the motor components. For example, gaps may be formed between turns of the helical coil around the motor jacket and/or the helical coil may not overlap with itself around the motor jacket to cover a sufficient surface area of the outer surface of the motor jacket. Therefore, helical coil cooling systems may not provide sufficient thermal energy transfer for systems that use a low pressure refrigerant. As used herein, low pressure refrigerants may include refrigerants that have a normal boiling point of about 19 degrees Celsius (66 degrees Fahrenheit) at one atmosphere of pressure. As used herein, "normal boiling point" may refer to a boiling point temperature measured at one atmosphere of pressure.

The present disclosure is directed to an improved hermetic motor cooling system that reduces pressure drop and increases an amount of thermal energy transfer between the refrigerant and motor components within a motor housing, such that a low pressure refrigerant may effectively be utilized in an HVAC&R system. In some embodiments, the cooling system includes an annulus formed in the motor housing that surrounds windings of the stator of the motor. Refrigerant from the HVAC&R system may fill the annulus before being discharged through a plurality of openings spaced about the annulus. The discharged refrigerant may then directly contact at least a portion of the stator to absorb thermal energy from the stator and cool the motor housing. The annulus of the cooling system distributes the refrigerant evenly over a portion of the stator to enhance an amount of thermal transfer occurring in the motor housing. Further, the annulus enables a pressure drop of the refrigerant through the motor housing to be reduced because the flow path of the refrigerant through the annulus is relatively short when compared to the flow path of the refrigerant through existing cooling systems (e.g., the helical coil). As such, embodiments of the HVAC&R system disclosed herein, may improve an efficiency of the motor and increase the operating range of the compressor and/or the refrigeration system.

Figure 1:
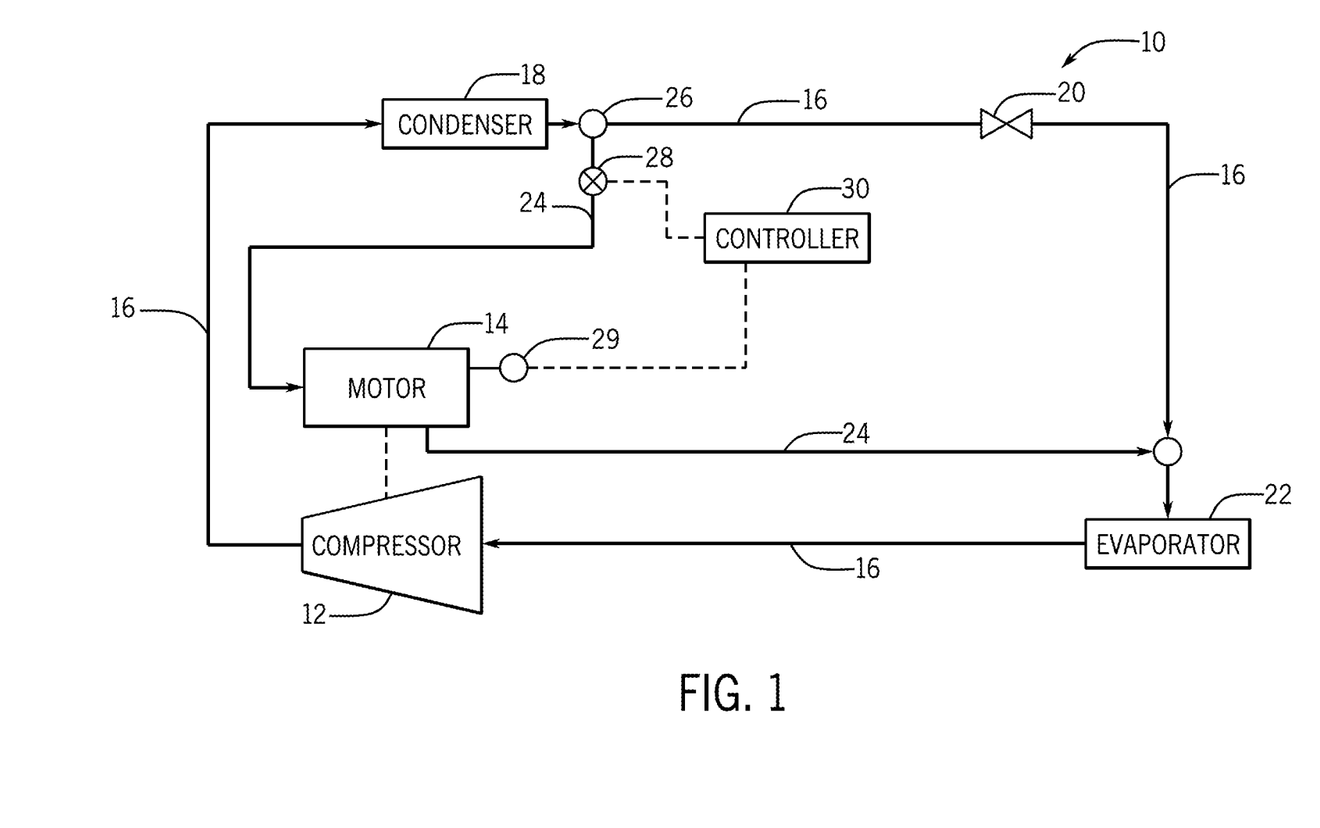
FIG. 1 is a schematic of an embodiment of a heating, ventilation, air conditioning, and refrigeration (HVAC&R) system having a hermetic motor that may utilize an improved cooling system, in accordance with an aspect of the present disclosure.

To help illustrate the manner in which the present embodiments may be used in a system, FIG. 1 is a schematic representation of a heating, ventilating, air conditioning, and refrigeration (HVAC&R) system 10 that includes a compressor 12 driven by a motor 14 (e.g., a hermetic motor, an electric motor, a hydraulic motor, a pneumatic motor, etc.). As shown in the illustrated embodiment of FIG. 1, the compressor 12 is disposed in a refrigerant loop 16 and the compressor 12 is configured to circulate refrigerant within the refrigerant loop 16. Refrigerant exiting the compressor 12 is received by a condenser 18. In some embodiments, the condenser 18 is an air cooled condenser, such that air is directed over coils of the condenser 18 to absorb thermal energy (e.g., heat) from the refrigerant flowing through the coils. In other embodiments, the condenser 18 may be a shell and tube heat exchanger that places the refrigerant in a heat exchange relationship with a cooling fluid (e.g., water). In any case, the refrigerant transfers thermal energy to a working fluid of the condenser 18 (e.g., air, water, or another suitable cooling fluid), thereby reducing a temperature of the refrigerant exiting the condenser 18.

The refrigerant exiting the condenser 18 may continue along the refrigerant loop 16 toward an expansion device 20. The expansion device 20 is configured to reduce a pressure of the refrigerant, which also further reduces a temperature of the refrigerant. The refrigerant then enters an evaporator 22 disposed along the refrigerant loop 16. The refrigerant flowing through the evaporator 22 absorbs thermal energy (e.g., heat) from a working fluid (e.g., water and/or air). In some embodiments, the evaporator 22 is a shell and tube heat exchanger that places the refrigerant in a heat exchange relationship with a cooling fluid (e.g., water). In other embodiments, the evaporator 22 places the refrigerant in a heat exchange relationship with air. The working fluid of the evaporator 22 (e.g., water, air, or another suitable fluid) may be configured to cool a load, such as a building, a room, a house, or another conditioned space. The refrigerant exiting the evaporator 22 then completes the refrigerant loop 16 by re-entering the compressor 12.

As shown in the illustrated embodiment of FIG. 1, a portion of the refrigerant exiting the condenser 18 may be diverted to a motor cooling loop 24 via a tee 26 (e.g., a first tee and/or a first three-way valve). A valve 28 (e.g., a ball valve, a butterfly valve, a gate valve, a globe valve, a diaphragm valve, and/or another suitable valve) may be disposed along the motor cooling loop 24 downstream of the tee 26 with respect to the flow of the refrigerant through the motor cooling loop 24. The valve 28 may be configured to adjust an amount of the refrigerant that is diverted into the first motor cooling loop 24 from the refrigerant loop 16. In some embodiments, the valve 28 is coupled to a controller 30, which adjusts a position of the valve 28 to control a flow of the refrigerant through the motor cooling loop 24 based on a temperature of the motor 14 monitored by a sensor 29 (e.g., temperature sensor), for example. The refrigerant flowing through the motor cooling loop 24 is directed into a housing (see, e.g., FIG. 2) of the motor 14 to place the refrigerant in a heat exchange relationship with a component (e.g., a stator, a rotor, and/or bearings)) of the motor 14. Accordingly, the refrigerant absorbs thermal energy (e.g., heat) from the motor 14 to reduce a temperature of the motor 14. The refrigerant is then directed from the motor 14 back toward the refrigerant loop 16, where the refrigerant flows into the evaporator. In some embodiments, the motor cooling loop 24 includes a flow generating device, such as a pump, an eductor, a compressor, or another suitable device that facilitates a flow of the refrigerant through the motor cooling loop 24. In other embodiments, the refrigerant flows through the motor cooling loop 24 via a pressure differential of the refrigerant upstream of the motor 14 and downstream of the motor 14 (e.g., a pressure of the refrigerant exiting the condenser 18 is greater than the pressure of the refrigerant entering the evaporator 22 because of the pressure drop caused by the expansion device 20).

Figure 2:
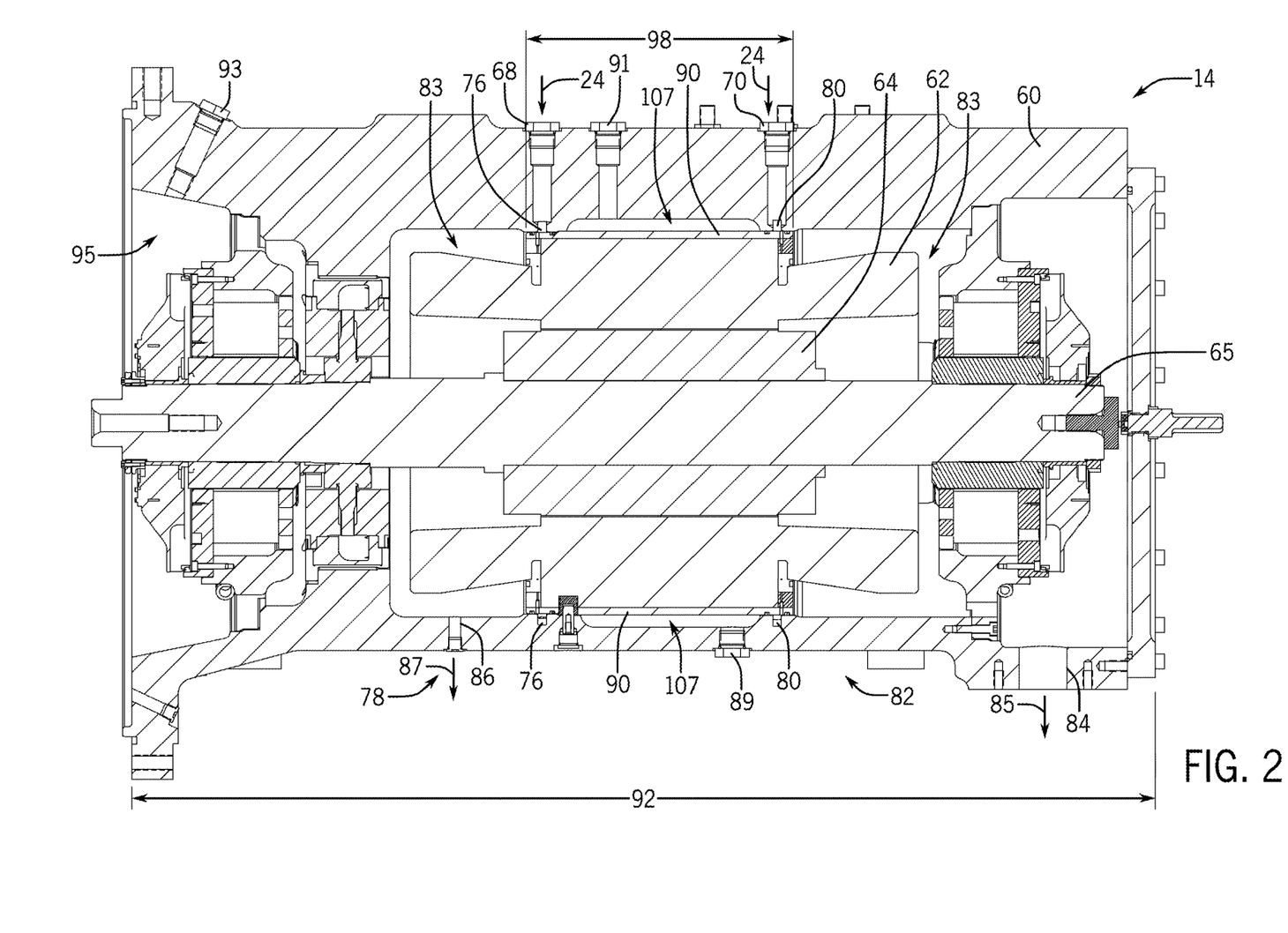
FIG. 2 is a cross-sectional view of an embodiment of the hermetic motor of the HVAC&R system of FIG. 1 that includes the improved cooling system, in accordance with an aspect of the present disclosure.

FIG. 2 is a cross section of the motor 14 that illustrates a flow path of the refrigerant in the motor cooling loop 24 through the motor 14. As shown in the illustrated embodiment of FIG. 2, the motor 14 includes a housing 60 as well as a stator 62, a rotor 64 coupled to a shaft 65, and bearings (e.g., ball bearings, sleeve bearings, magnetic bearings, or other suitable bearings) disposed in the housing 60. The motor cooling loop 24 may direct refrigerant into the housing 60 through a first inlet 68 and/or a second inlet 70. In some embodiments, the first inlet 68 directs the refrigerant into a first annulus 76 which surrounds the stator 62 at a first end 78 (e.g., a drive end) of the motor 14. Similarly, the second inlet 70 directs the refrigerant into a second annulus 80 that surrounds the stator 62 at a second end 82 (e.g., an opposite drive end) of the motor 14.

In some embodiments, the refrigerant flows through the annuli 76 and 80 and ultimately fill the annuli 76 and 80. The refrigerant is then discharged through openings (see, e.g., FIG. 4) spaced about each of the annuli 76 and 80, such that the refrigerant comes into contact with windings of the stator 62. For example, the openings may direct the refrigerant radially inward toward the windings of the stator 62, such that the refrigerant directly contacts portions of the windings that include relatively high temperatures (e.g., roots of the windings). The refrigerant that contacts the stator 62 may then flow through a cavity 83 of the housing 60 before being discharged back toward the refrigerant loop 16. As discussed above, the refrigerant flowing within the motor cooling loop 24 may be refrigerant exiting the condenser 18. Accordingly, the refrigerant in the first motor cooling loop 24 is refrigerant liquid. In some embodiments, a first portion of the refrigerant discharged from the annuli 76 and 80 may absorb significant heat from the stator 62 and evaporate into refrigerant vapor. Accordingly, the motor housing 60 includes a vent 84 that enables refrigerant vapor 85 to flow to the evaporator 22.

Additionally or alternatively, a second portion of the refrigerant may remain refrigerant liquid. The motor housing 60 also includes a drain 86 that enables refrigerant liquid 87 to return to the refrigerant loop 16. Further, the motor housing 60 may include a stator cooling path 107 (e.g., a cavity formed between the motor housing 60 and a sleeve 90) that receives refrigerant and provides further cooling of the motor 14. For example, refrigerant may flow into the stator cooling path 107 via an inlet 89 and flow out of the stator cooling path 107 through an outlet 91. Accordingly, refrigerant flows through within the stator cooling path 107 to cool components of the motor 14, such as bearings, the rotor 64, and/or other suitable components.

As shown in the illustrated embodiment of FIG. 2, the refrigerant that cools the stator 62 (e.g., windings) may be directed toward the vent 84 and/or the drain 86, such that the refrigerant ultimately flows back to the evaporator 22. As the refrigerant flows from the stator 62 toward the vent 84 and/or the drain 86, the refrigerant may also contact and absorb heat (e.g., thermal energy) from the rotor 64 and/or bearings in the motor housing 60.

Further still, the motor housing 60 may include a port 93 that receives refrigerant for cooling a cavity 95 within the motor housing 60. The cavity 95 may be adjacent to a diffuser plate of the motor, and thus, absorb thermal energy (e.g., heat) from the diffuser plate. The refrigerant may thus cool the diffuser plate in addition to the stator 62 and the rotor 64, and thus, further cool the motor housing 60.

The stator 62 of the motor 14 may be disposed within a sleeve 90 that is also disposed within the motor housing 60. In some embodiments, the annuli 76 and 80 may be formed within the housing 60 adjacent to the sleeve 90, such that the annuli 76 and 80 surround the stator 62. The sleeve 90 may be extended when compared to existing motors 14 to accommodate the annuli 76 and 80. For example, the annuli 76 and 80 may be positioned at locations along a length 92 of the motor 14 corresponding to the inlets 68, 70, and 72 which may be positioned at the first end 78 (e.g., the drive end) of the motor 14 (e.g., inlets 68 and 72) and the second end 82 (e.g., the opposite drive end) of the motor 14 (e.g., inlet 70). As such, the sleeve 90 is extended to include a length 98 that corresponds to a length between the first end 78 and the second end 82.

Figure 3:
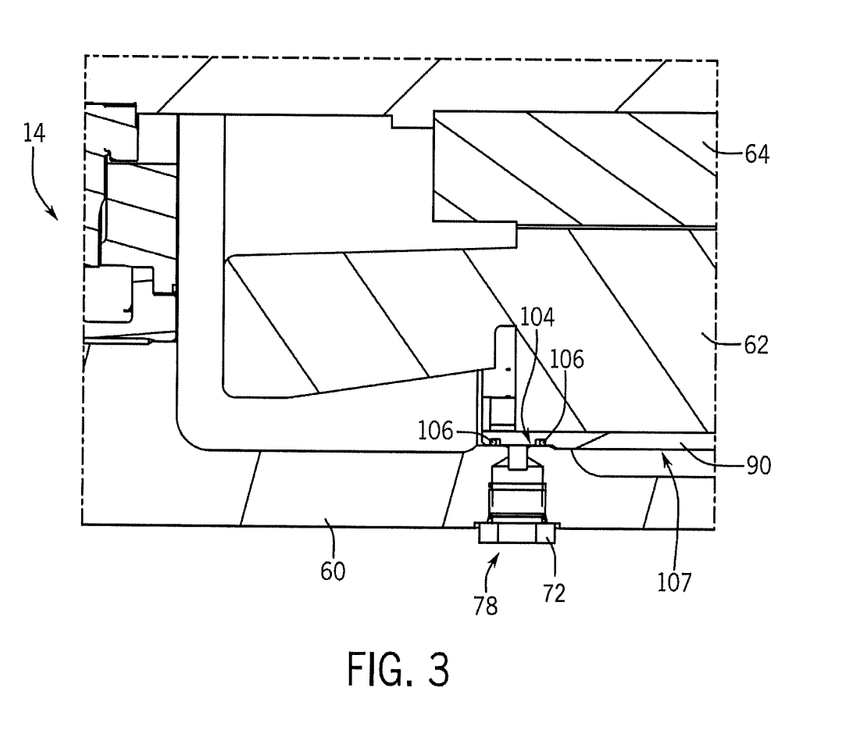
FIG. 3 is a partial cross-sectional view of an embodiment of an inlet of a cooling system for the hermetic motor of FIG. 2, in accordance with an aspect of the present disclosure.

FIG. 3 is an expanded cross section of an embodiment of the inlet 72. As shown in the illustrated embodiment of FIG. 3, the inlet 72 directs the refrigerant into the annulus 76 that surrounds the stator 62 at the first end 78 (e.g., the drive end) of the motor 14. In some embodiments, the annulus includes a flow area that enables adequate flow of refrigerant to cool the motor 14, while reducing pressure drop. It should be understood that the flow area of the annulus may be modified (e.g., scaled) based on a size and/or capacity of the motor 14. As such, a larger motor that includes a greater capacity may include the annulus 76 having a greater flow area than a smaller motor with a reduced capacity. Although the annulus 76 forms a relatively narrow passage for the refrigerant to flow through, the length of the annulus 76 is substantially the same as a circumference of the stator 62. Additionally, the refrigerant is discharged from the annulus 76 before the refrigerant flows around the entire circumference of the stator 62 as a result of coupling both the first inlet 68 and the third inlet 72 to the annulus 76. Accordingly, a pressure drop incurred by the refrigerant flowing into the annulus 76 is reduced when compared to existing cooling systems for hermetic motors (e.g., helical coils) because of the shorter flow path of the refrigerant in the cooling system.

As shown in the illustrated embodiment of FIG. 3, the annulus 76 is sealed between the sleeve 90 and a surface 104 of the motor housing 60 using seals 106. As such, refrigerant may be blocked from leaking into the cavity 83 or stator cooling path 107 before flowing into the annulus 76 from the inlet 72. In some embodiments, the seals 106 include o-rings, silicone, and/or another suitable sealant that blocks the refrigerant from leaking out of the annulus 76 at the inlet 72. As discussed above, the annuli 76 and 80 each include a plurality openings 120 that are spaced about the annuli 76 and 80 to direct the refrigerant toward the stator 62 and absorb heat from the stator 62.

Figure 4:
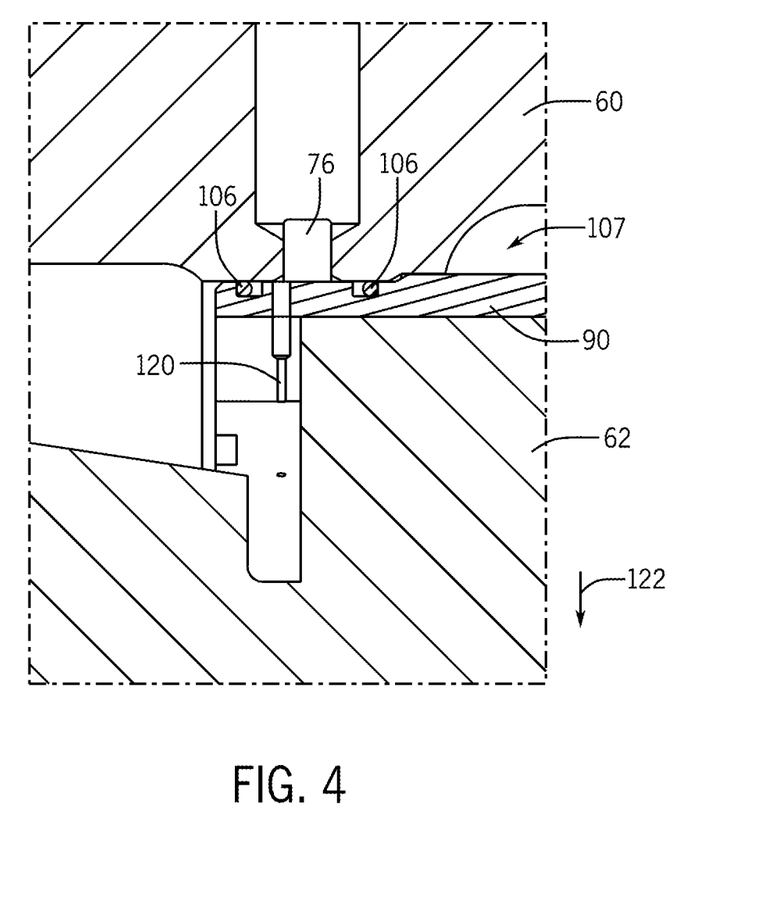
FIG. 4 is a partial cross-sectional view of an embodiment of an opening in an annulus of the cooling system of FIG. 3, in accordance with an aspect of the present disclosure.

For example, FIG. 4 is an expanded perspective view of an opening 120 of the plurality of openings 120 that directs the refrigerant toward the stator 62. As shown in the illustrated embodiment of FIG. 4, the opening 120 is directed radially inward toward the stator 62. In other words, the opening 120 directs the refrigerant in a direction 122 that enables the refrigerant to flow directly from the annulus 76 to the stator 62. As shown in the illustrated embodiment of FIG. 4, the opening 120 extends from the annulus 76, through the sleeve 90, and into the stator 62. As such, the refrigerant flowing into the housing 60 via the inlets 68, 70, and 72 may directly contact the stator 62 to cool the windings of the stator, thereby reducing a temperature within the housing 60.

In some embodiments, the plurality of openings 120 is spaced substantially uniformly about the annuli 76 and 80 (e.g., spaced equally about a circumference of the stator 62). In other embodiments, the plurality of openings 120 is spaced non-uniformly about the annuli 76 and 80. Additionally, each of the annuli 76 and 80 may include a suitable number of the openings 120 that enable the refrigerant to sufficiently cool the stator 62 (and/or the rotor 64 and the bearings of the motor 14) to a predetermined temperature. For example, in some embodiments, each of the annuli 76 and 80 include 5, 10, 15, 20, 25, or more of the openings 120. Additionally, the number of openings 120 included in each of the annuli 76 and 80 may be predetermined based on the size and/or capacity of the motor 14. Thus, as the size and capacity of the motor increase, the number of openings 120 included in each annuli 76 and 80 may also increase.

Figure 5:
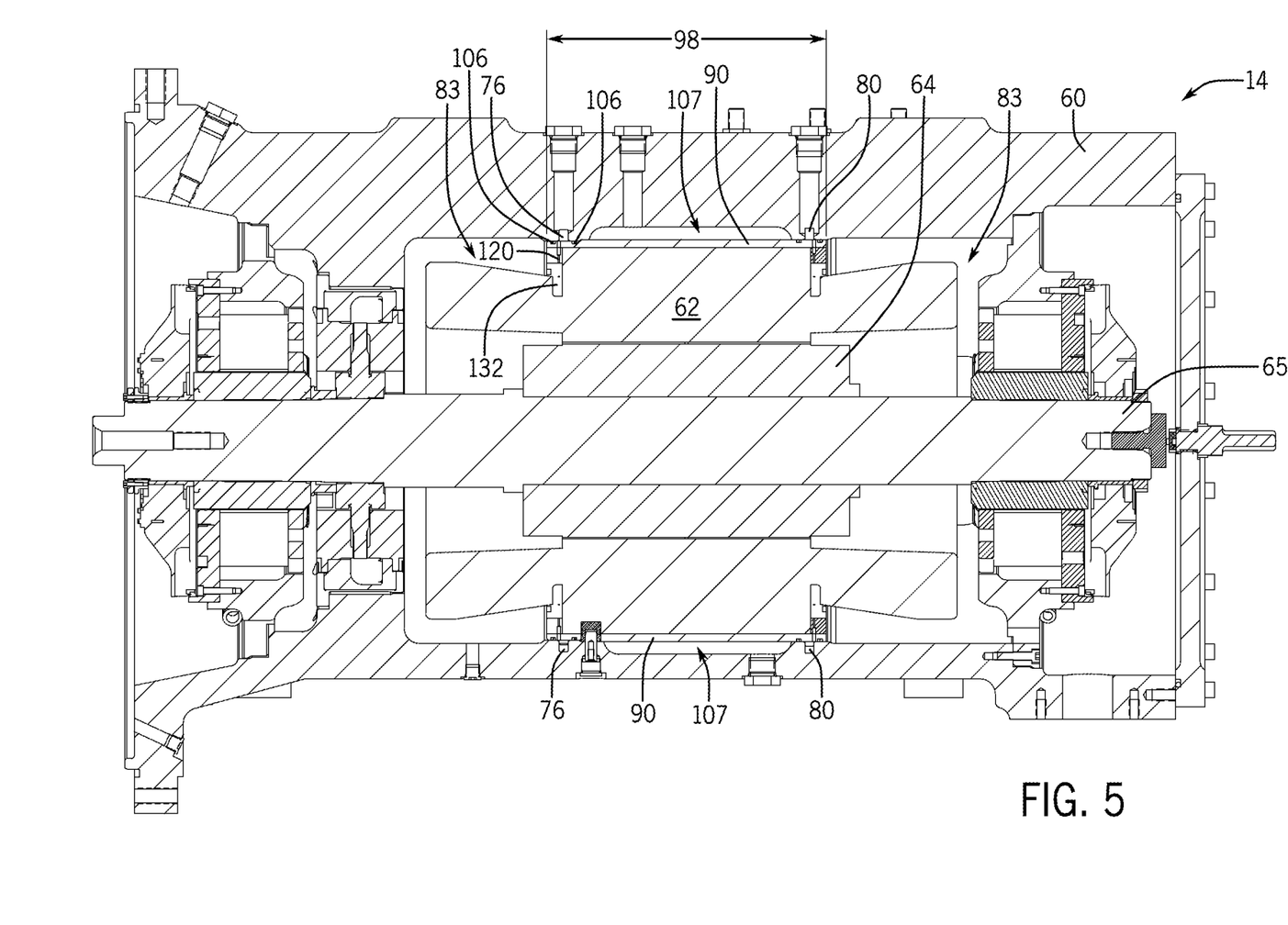
FIG. 5 is a cross-sectional view of an embodiment of the hermetic motor of the HVAC&R system of FIG. 1 that includes an embodiment of the improved cooling system, in accordance with an aspect of the present disclosure.

In some embodiments, the length 98 of the sleeve 90 (e.g., stator sleeve) enables the seals 106 to be disposed about the annulus 76 to block a flow of refrigerant from entering or flowing into the cavity 83 or the stator cooling path 107. Further, FIG. 5 illustrates an embodiment of the sleeve 90 that includes the opening 120 formed within the sleeve 90. The length 98 of the sleeve 90 enables the opening 120 to be formed and further reduces an amount thermal energy transfer to the motor housing 60. For example, the opening 120 in the sleeve 90 directs refrigerant toward exposed windings of the stator 62. In some cases, the stator 62 includes exposed windings (e.g., windings not wrapped with insulative material) and insulated windings (e.g., windings wrapped with insulative material). The exposed windings may be positioned at a slot entry 132 of the sleeve 90. As used herein, the slot entry 132 refers to one or more slots of the stator 62 that receive the windings. The windings are insulated outside of the one or more slots to reduce heat transfer from the windings to the housing 60. However, in some cases, a portion of the windings may be exposed outside of the slot entry 132 to ensure that substantially all of the windings disposed within the stator 62 are exposed (e.g., not insulated).

As such, the opening 120 through the sleeve 90 enables the refrigerant to exchange thermal energy with the exposed windings and reduce an amount of heat transferred from the windings to the motor housing 60. As should be understood, exposed windings may transfer a relatively large amount of thermal energy (e.g., heat) to the motor housing 60 when compared to insulated windings. Accordingly, transferring thermal energy from the exposed windings to the refrigerant flowing through the opening 120 reduces an amount of thermal energy that is ultimately transferred to the motor housing 60.

Figure 6:
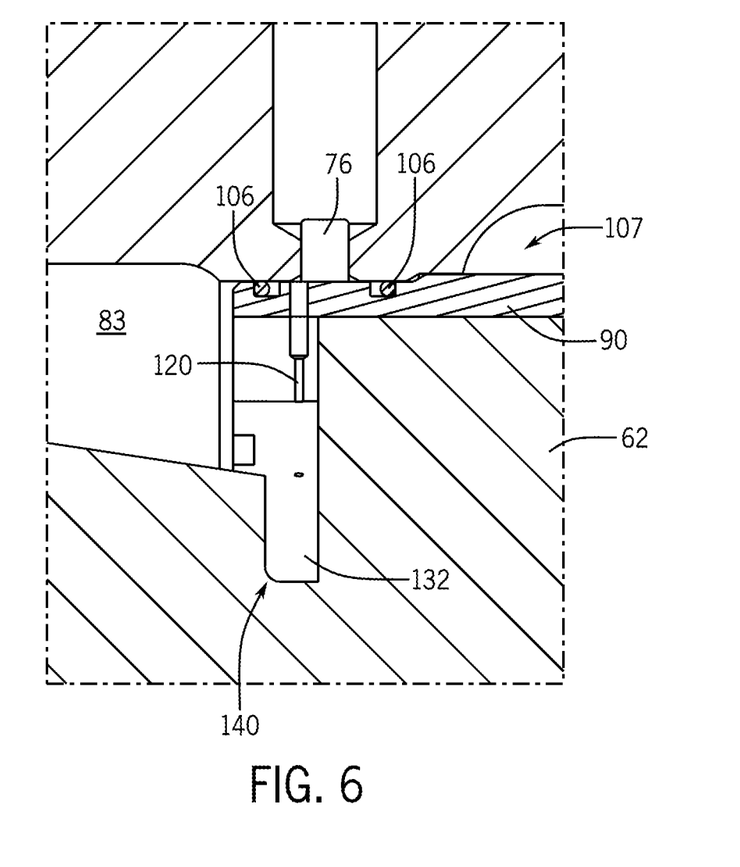
FIG. 6 is a partial cross-sectional view of an embodiment of the inlet of the cooling system for the hermetic motor of FIG. 5, in accordance with an aspect of the present disclosure.

FIG. 6 is a partial cross-sectional view of an embodiment of the sleeve 90 having the opening 120 formed within the sleeve 90. As shown in the illustrated embodiment of FIG. 6, the opening 120 directs refrigerant from the annulus 76 toward the slot entry 132, where the refrigerant may absorb thermal energy (e.g., heat) from exposed windings 140 disposed within (or adjacent to) the slot entry 132. Further, the seals 106 are disposed on either side of the annulus 76 to block refrigerant from entering or flowing into the cavity 83 or the stator cooling path 107. As shown in the illustrated embodiment of FIG. 6, the seals 106 are disposed on both sides of the opening 120 to enable the refrigerant to flow through the opening 120, but to block the refrigerant from entering or flowing into the cavity 83 or the stator cooling path 107.

While the illustrated embodiment of FIG. 6 shows the opening 120 as a substantially cylindrical channel extending from the annulus 76 to the slot entry 132, it should be noted that in other embodiments, the opening 120 may be a radial slot, an axial slot, another suitably shaped channel, or any suitable opening that directs refrigerant from the annulus 76 to the slot entry 132. Further, the embodiments of FIGS. 2-6 above discuss the annulus 76 as fully surrounding a circumference of the stator 62. However, in other embodiments, the annulus 76 (and/or the annulus 80) may surround half of the circumference of the stator 62, a quarter of the circumference of the stator 62, or any other suitable amount of the circumference of the stator 62 to absorb sufficient thermal energy from the stator 62 to maintain a temperature of the motor 14 at a predetermined temperature.

Figure 7:
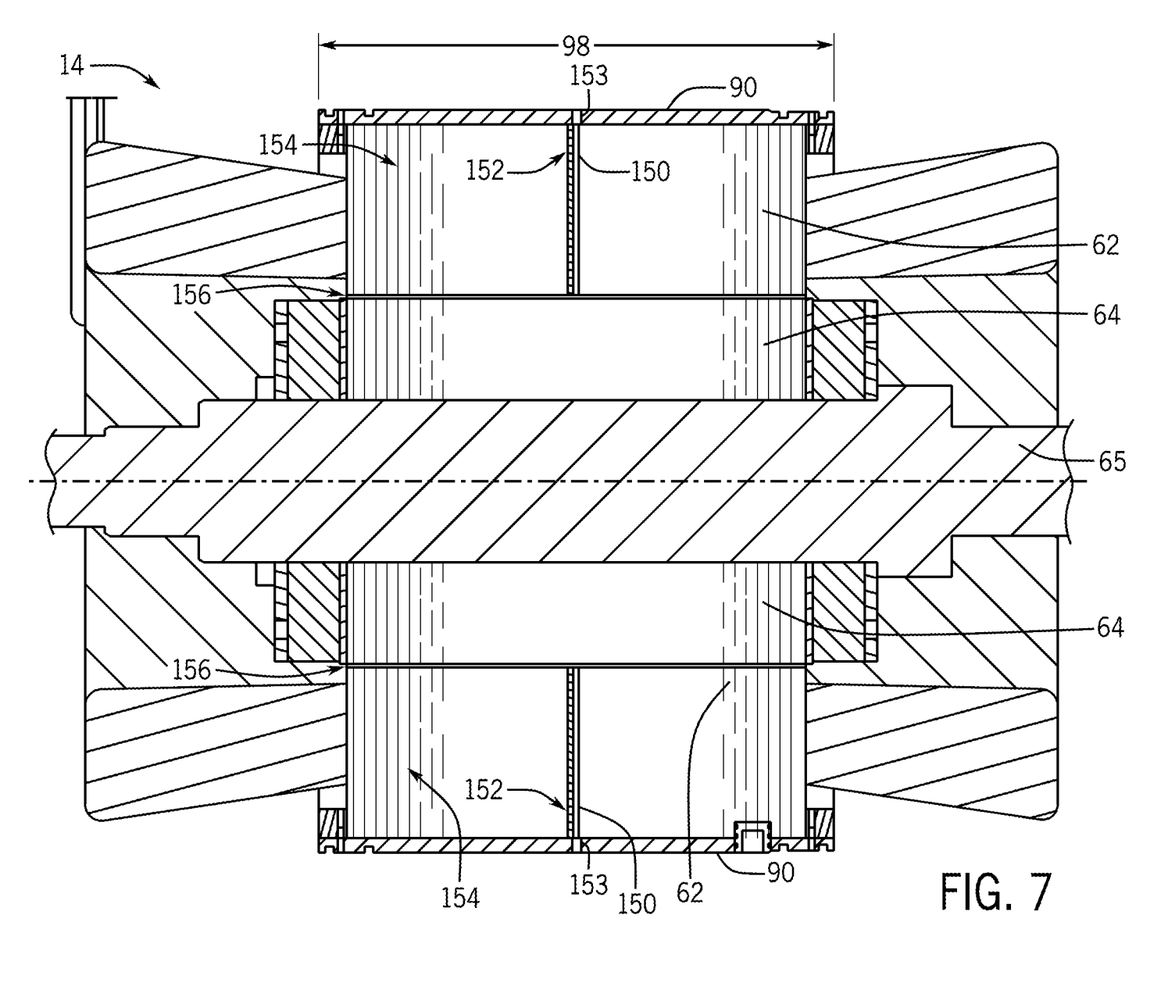
FIG. 7 is a cross-sectional view of an embodiment of additional cooling features of the cooling system for the hermetic motor of the HVAC&R system of FIG. 1, in accordance with an aspect of the present disclosure.

FIG. 7 is a cross-sectional view of an embodiment of the motor 14 having additional cooling features configured to enhance an amount of thermal energy (e.g., heat) absorbed from the rotor 64. As shown in the illustrated embodiment of FIG. 7, the cooling system includes a vent slot 150 configured to receive and direct refrigerant through a central portion 152 of the stator 62. In some embodiments, the refrigerant is directed into the vent slot 150 from the stator cooling path 107. In other embodiments, the refrigerant is directed into the vent slot 150 via a plurality of openings 153 (e.g., drilled holes, radial slots, or axial slots) extending through the sleeve 90.

In any case, the stator 62 may include a lamination stack 154 configured to facilitate movement of the rotor 64 via production of an electromagnetic field as the rotor 64 is rotated within the motor housing 60. The vent slot 150 may be positioned through a center of the lamination stack 154 to maintain a symmetry of the lamination stack 154, and thus, maintain an efficiency of the motor 14. The vent slot 150 forms a channel for the refrigerant to flow from the sleeve 90 to a gap 156 (e.g., an air gap) formed between the stator 62 and the rotor 64. As such, the refrigerant is directed into the gap 156, such that the refrigerant may absorb thermal energy from both the stator 62 and the rotor 64. The vent slot 150 thus reduces a temperature within the motor housing 60, which may further enhance an efficiency of the motor 14.

In some embodiments, the sleeve 90 is formed from a metallic material. Specifically, the sleeve 90 may include aluminum or another suitable non-magnetic metal. Forming the sleeve 90 from aluminum or non-magnetic metal may further enhance an efficiency of the motor 14 by reducing losses incurred by eddy currents as the rotor 64 is rotated within the housing 60. Forming the sleeve 90 from a substantially non-magnetic material, reduces interference between the sleeve 90 and the electromagnetic field produced between the rotor 64 and the stator 62 as the rotor 64 rotates within the housing 60.

While only certain features and embodiments of the present disclosure have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the disclosure. Furthermore, in an effort to provide a concise description of the exemplary embodiments, all features of an actual implementation may not have been described (i.e., those unrelated to the presently contemplated best mode of carrying out an embodiment, or those unrelated to enabling the claimed embodiments). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A system for cooling a hermetic motor, comprising:
a motor cooling refrigerant flow path configured to direct refrigerant from a condenser disposed along a refrigerant loop to the hermetic motor, and from the hermetic motor back to the refrigerant loop;
a housing of the hermetic motor disposed along the motor cooling refrigerant flow path and configured to receive the refrigerant from the condenser, wherein the housing of the hermetic motor comprises a first annulus formed therein and surrounding at least a first portion of a stator of the hermetic motor and a second annulus formed therein and surrounding at least a second portion of the stator, wherein the housing is configured to direct a first flow of the refrigerant into the first annulus and to direct a second flow of the refrigerant into the second annulus; and
a sleeve disposed between the stator and the housing, wherein the first annulus is fluidly separate from the second annulus via a seal disposed between the housing and the sleeve and between the first annulus and the second annulus, wherein the sleeve comprises a plurality of openings formed therein, wherein the plurality of openings is configured to direct the first flow of the refrigerant from the first annulus toward the stator to directly contact the stator and then flow directly into a cavity of the housing of the hermetic motor, wherein each opening of the plurality of openings extends from the first annulus and through the sleeve, and wherein the housing of the hermetic motor comprises an outlet configured to direct the first flow of the refrigerant from the cavity of the housing toward an evaporator disposed along the refrigerant loop.

2. The system of claim 1, wherein the first annulus is disposed on a drive end of the hermetic motor and wherein the second annulus is disposed on an opposite drive end of the hermetic motor.

3. The system of claim 1, wherein the system is configured to direct the refrigerant along the motor cooling refrigerant flow path via a pressure differential between the condenser and the evaporator.

4. The system of claim 1, comprising a flow generating device configured to direct the refrigerant along the motor cooling refrigerant flow path.

5. The system of claim 1, wherein the plurality of openings is uniformly spaced about a circumference of the stator.

6. The system of claim 1, wherein the motor cooling refrigerant flow path is configured to direct the refrigerant to contact a rotor of the hermetic motor, bearings of the hermetic motor, another component of the hermetic motor, or a combination thereof, within the cavity of the hermetic motor.

7. The system of claim 1, wherein the seal is a first seal, the system comprises a second seal disposed between the housing and the sleeve, and the second seal is disposed on a side of the first annulus opposite the first seal.

8. The system of claim 7, wherein the plurality of openings extends through the sleeve between the first seal and the second seal.

9. A heating, ventilating, air conditioning, and refrigeration (HVAC&R) system, comprising:
a refrigerant loop;
a compressor disposed along the refrigerant loop and configured to circulate refrigerant within the refrigerant loop;
a condenser disposed downstream of the compressor along the refrigerant loop with respect to a flow direction of the refrigerant within the refrigerant loop;
an evaporator disposed downstream of the condenser along the refrigerant loop with respect to the flow direction of the refrigerant within the refrigerant loop;
a hermetic motor configured to drive the compressor; and
a motor cooling system, comprising:
a motor cooling refrigerant flow path configured to direct a portion of the refrigerant from the condenser to the hermetic motor, and from the hermetic motor to the evaporator;
a housing of the hermetic motor disposed along the motor cooling refrigerant flow path and configured to receive the portion of the refrigerant from the condenser, wherein the housing of the hermetic motor comprises a first annulus formed therein and surrounding at least a first portion of a stator of the hermetic motor and a second annulus formed therein and surrounding at least a second portion of the stator, wherein the housing is configured to direct a first flow of the portion of the refrigerant into the first annulus and to direct a second flow of the portion of the refrigerant into the second annulus; and
a sleeve disposed between the stator and the housing, wherein the first annulus and the second annulus are fluidly separated from one another via a seal disposed between the first annulus and the second annulus and between the housing and the sleeve, wherein the sleeve comprises a plurality of openings formed therein, wherein the plurality of openings is configured to direct the first flow of the portion of the refrigerant from the first annulus to directly contact the stator and flow into a cavity of the housing of the hermetic motor, and wherein each opening of the plurality of openings extends from the first annulus and through the sleeve.

10. The HVAC&R system of claim 9, wherein the housing of the hermetic motor comprises an outlet configured to direct the first flow of the portion of the refrigerant from the cavity of the housing toward the evaporator.

11. The HVAC&R system of claim 9, wherein the first annulus is disposed on a drive end of the hermetic motor and wherein the second annulus is disposed on an opposite drive end of the hermetic motor.

12. The HVAC&R system of claim 11, wherein the housing of the hermetic motor comprises a first inlet coupled to the first annulus on the drive end of the hermetic motor and a second inlet coupled to the second annulus on the opposite drive end of the hermetic motor.

13. The HVAC&R system of claim 9, wherein the plurality of openings is uniformly spaced about a circumference of the stator.

14. A method for cooling a hermetic motor, comprising:
diverting a portion of a refrigerant flow exiting a condenser in a refrigerant loop toward a motor cooling refrigerant path;
directing the portion of the refrigerant flow along the motor cooling refrigerant path into a housing of the hermetic motor, wherein the hermetic motor is configured to drive a compressor disposed along the refrigerant loop;
directing a first flow of the portion of the refrigerant flow through a first annulus formed in the housing of the hermetic motor;
directing a second flow of the portion of the refrigerant flow through a second annulus formed in the housing of the hermetic motor;
directing the first flow of the portion of the refrigerant flow through a plurality of openings formed in a sleeve of the hermetic motor, wherein the first annulus and the second annulus are fluidly separate from one another via a seal disposed between the housing and the sleeve and between the first annulus and the second annulus; wherein the sleeve is positioned between the housing and a stator of the hermetic motor, such that the plurality of openings directs the first flow of the portion of the refrigerant flow from the first annulus toward the stator to directly contact the stator and then flow from the stator into a cavity of the housing of the hermetic motor, and wherein each opening of the plurality of openings extends from the first annulus and through the sleeve; and
directing the first flow of the portion of the refrigerant flow from the cavity of the housing of the hermetic motor back toward the refrigerant loop.

15. The method of claim 14, wherein diverting the portion of the refrigerant flow exiting the condenser in the refrigerant loop toward the motor cooling refrigerant path comprises adjusting a valve disposed along the motor cooling refrigerant path based on feedback from a temperature sensor disposed in the hermetic motor.

16. The method of claim 14, wherein directing the portion of the refrigerant flow along the motor cooling refrigerant path into the housing of the hermetic motor comprises directing the first flow of the portion of the refrigerant flow into an inlet on a drive end of the hermetic motor.

17. The method of claim 14, wherein directing the first flow of the portion of the refrigerant flow from the cavity of the housing of the hermetic motor back toward the refrigerant loop comprises directing the first flow of the portion of the refrigerant flow from the cavity of the housing of the hermetic motor to an evaporator disposed along the refrigerant loop.

* * * * *